United States Patent [19]

Liljenzin et al.

[11] 3,870,060

[45] Mar. 11, 1975

[54] METHOD OF REMOVING MONOVALENT INORGANIC ACIDS FROM AN AQUEOUS SOLUTION CONTAINING METAL SALTS OF THE ACIDS

[75] Inventors: Jan-Olov Liljenzin, Kallered; Hans Reinhardt; Helge Jan Arnold Rydberg, both of V. Frolunda, all of Sweden

[73] Assignee: Stora Kopparbergs Bergslags Aktiebolag, Falun, Sweden

[22] Filed: Feb. 26, 1974

[21] Appl. No.: 336,007

[52] U.S. Cl............... 134/3, 134/10, 134/13, 134/41, 423/1, 423/27, 423/144, 423/166, 423/390, 423/391, 423/488, 423/351
[51] Int. Cl............................................ C23g 1/36
[58] Field of Search ............... 134/10, 41, 13, 42, 3, 134/41; 423/387, 390, 484, 488, 489, 144, 166, 1, 27, 391, 531; 75/101 R, 115, 116, 97 R

[56] References Cited
UNITED STATES PATENTS 2,993,757   7/1961   Dasher et al.................... 423/484
3,186,809   6/1965   Kreevoy et al.................. 423/488 X
3,573,005   3/1971   Daniel et al. .................... 423/321
3,635,664   1/1972   Morimoto........................ 423/488 X Primary Examiner—S. Leon Bashore
Assistant Examiner—Richard H. Tushin
Attorney, Agent, or Firm—Curtis, Morris & Safford

[57] ABSTRACT

Monovalent inorganic acids such as hydrofluoric acid can be removed from spent pickling baths by bringing the bath, which shall have a content of sulphuric acid at least equivalent to the metal ion content of the bath, into contact with an organic liquid which contains a compound which forms an adduct with the monovalent inorganic acids. The organic phase extracts the monovalent inorganic acids from the aqueous phase. Metals can then be recovered from the aqueous phase, if desired. The organic phase may then be washed with water, resulting in the monovalent inorganic acids being transferred from the organic phase into the water. The acid aqueous solution thus produced may be used for preparing a fresh pickling bath.

13 Claims, 1 Drawing Figure

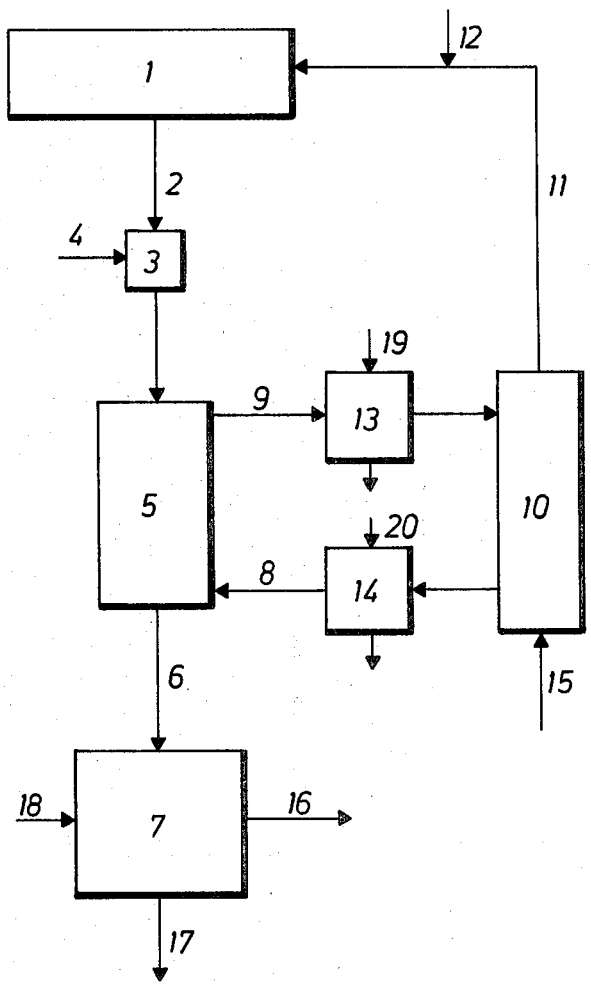

METHOD OF REMOVING MONOVALENT INORGANIC ACIDS FROM AN AQUEOUS SOLUTION CONTAINING METAL SALTS OF THE ACIDS

The present invention relates to a method by which, using liquid extraction, monovalent inorganic acids can be removed from aqueous solutions containing metal salts of the acids. The invention is applicable amongst other things to the processing of various industrial waste water, for example pickling baths, and also for hydrometallurgical processes.

In the industrial sector, a great deal of flud waste occurs in the form of aqueous solutions containing metal salts or acids. In cases where such industrial waste primarily contains sulfates and sulphuric acid, methods have been developed for rendering the solutions harmless and utilising the metals. If these liquid waste products however, contain larger or smaller quantities of monovalent inorganic acids, especially nitric acid and halogen acids or salts thereof, they have hitherto presented considerable problems because of the injurious nature of these compounds (for example nitric acid, fluorides, nitrates), because of their corrosiveness (for example chloride) or because of the difficulty of extracting the acids or metals (for example fluorhydric acid forms a complex which is extremely difficult to precipitate with many metals). This has prevented the application of these acids, for example to the leaching of ores, since the acids cannot be recovered to a sufficient extent to make the application economical and harmless from the environmental point of view.

In accordance with the invention, monovalent inorganic acids, preferably nitric acid and halogen acids, are removed from an aqueous solution of the metal salts of these acids in the following way. The sulphuric acid content of the solution is so adjusted that it is at least equivalent to the metal ion content of the solution, whereafter the monovalent inorganic acids are extracted by bringing the solution into contact with compounds containing an organic liquid phase, which compounds form adducts with the monovalent acids. The aqueous solution can contain water-soluble salts of one or more of the monovalent acids and one or more metal ions ranging from alkali or ammonia ions to heavy metal ions. If the solution does not contain sufficient sulphuric acid, then some is added. The pH value of the solution drops as a consequence. The acidity is limited only by the stability of the organic substances and the material of which the apparatus is made. If the solution should contain strongly oxidising substances, for example chromic acid, chlorine or chlorine oxides, it may be desirable to reduce these prior to extraction. With the organic phase, a suitable combination of diluent and adduct-forming agent should be used. The organic phase should have a high separation factor for monovalent acids HX vis-a-vis both sulphuric acid and metal ions $Me^{z+}$. The separation factor is the ratio between the distribution factor D between organic phase and aqueous phase, of the respective media. The following table lists a number of organic phases which are suitable for the extraction of monovalent acids.

TABLE

| Reactant (Q) | Organic phase | Aqueous phase | HX | D HX | D $H_2SO_4$ | D $MeSO_4$ |
|---|---|---|---|---|---|---|
| Tributyl phosphate (TBP) | 75% TBP in kerosene | 2M $H_2SO_4$ | $HNO_3$ | 1.1 | ~0 | ~0(CU $10^{-2}$) |
| Methylisobutyl-ketone (hexone) | 100% hexone | 1M $H_2SO_4$ | HF | 1 | ~0 | ~0 |
| Diethylether | 100% diethylether | 6M $H_2SO_4$ | HCl | 0.2 | $4.10^{-3}$ | ~0(CU $10^{-3}$) |
| Trioctyl phosphine oxide (TOPO) | 4% TOPO in cyklohexane | 2M $H_2SO_4$ | $HNO_3$ | 0.1 | ~0 | |
| Diisobutyl ketone (DIBK) | 100% DIBK | 0.5 M $H_2SO_4$ | $HNO_3$ | 0.05 | ~0 | ~0 |
| n-butanol | 100% n-butanol | 0.5 M $H_2SO_4$ | $HNO_3$ | 0.7 | ~0.3 | ~0 |
| TBP | 100% TBP | 1M $H_2SO_4$ | HCl | 0.4 | ~0 | ~0 |
| DIBK | 100% DIBK | 6M $H_2SO_4$ | $HNO_3$ | 4 | ~0 | ~0 |

Upon extraction an adduct is formed in the organic phase in accordance with the formulae:

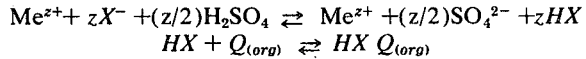

$$HX + Q_{(org)} \rightleftarrows HX\, Q_{(org)}$$

where $XX^-$ is the halogen or nitrate ion in the aqueous phase, Q is the adduct-forming agent, $Q_{(org)}$ is the organic phase and $HX\, Q_{(org)}$ is the adduct formed in the organic phase.

There is no universally usable reagent available, and instead the organic phase must in all cases be made up to accord with the particular system concerned. Certain multivalent inorganic acids, such as phosphoric acid and boric acid, can be extracted simultaneously with the monovalent acids, using certain adduct-forming agents, and this is an advantage if it is desired to extract these multivalent acids from such metal salt solutions. Certain heavy metals such as molybdenum and tungsten also have a tendency, in some cases, to transfer to the organic phase.

The invention can be carried out in conventional apparatus, as used for liquid extraction. Contact between the phases takes place in a mixer, whereafter separation of the phases takes place in a separate apparatus. Extraction will conveniently be carried out continuously in several stages and in counterflow between the phases.

It is preferred to split the adduct formed, in the organic extract obtained at the extraction, and thus recover the organic phase for renewed use. A variety of different ways of carrying out this kind of splitting, are known. For example, the acids can be leached out in the form of metal salts, using alkalis for example. A particularly advantageous method, however, is to recover the acids in the form suitable for the process from which the metal salt solution is obtained. In certain cases, the acids can be recovered by distillation or some other method, but more often than not it is best to leach them out from the organic phase using water, so that an aqueous phase is obtained which can be used directly or possibly boiled down to form concentrated acid. In certain cases, as stated before, the organic phase contains metals. These metals can conveniently be removed from the organic phase by leaching with a suitable liquid. This can either be carried out before or after the splitting of the adduct and the removal of monovalent inorganic acids from the organic phase.

The refined aqueous solution which is left after the extraction with the organic phase, contains metal ions, sulphate ions and possibley free sulphuric acid. if the metal is for example simply sodium, then after neutralisation the solution can be discharged into a suitable recipient. If on the other hand it contains injurious or valuable metals, then these must be removed by some suitable method. Certain metals, for example barium and calicum, precipitate as sulphates, whereas others, like the majority of the heavy metal salts, can be precipitated as hydroxides using alkalis, or extracted using suitable organic phases. The latter is particularly appropriate if different metals are to be separated from one another. Since the solution is free from monovalent acids and consists now of sulphates, there is a wider degree of choice in selecting the organic phase. If the sulphuric acid content is limited to the minimum possible, then the solution will be near-neutral, which makes it possible to employ organic phases which are unstable in a highly acid environment. There are wide possibilities for the separation of different metals from one another by the use of different organic phases and different leaching liquids for the organic phases.

In the following, a number of applications of the invention will be described in association with the flowchart illustrated in the drawing.

A flow 2 of a metal salt solution containing monovalent acids HX, is produced from a pickling or leaching process 1. The sulphuric acid content of the flow is adjusted at 3, if desired by the addition of sulphuric acid 4, and the flow then passes through a liquid extraction state 5 and leaves at 6 as a refined product containing no monovalent inorganic acids. In the liquid extraction stage, the ions, in the form of acids, will have created adducts with an adduct-forming agent, in an organic phase 8. From the extraction stage, the organic phase 9 leaves in the form of an extract from which the acids are separated in a separator stage 10. The acids 11 can conveniently be returned, possibly after replenishment at 12 with fresh acid or other additives, to the process 1 from which the metal salt solution is obtained. They can for example be leached out using water 15, or they can be separated by distillation. The organic phase 8, 9 can, if required, have any accompanying metal adducts removed from it either before, in an apparatus 13, or after, in an apparatus 14, the separation from the acids, by bringing it into contact with a suitable reagent 19, 20. The sulphate solution 6 can either simply be neutralised, in a stage 7, using a suitable additive 18, or metal ions can be separated from the solution and removed through an outlet 16, whereafter the solution is passed to a recipient through an outlet 17.

One field of application of the invention is the processing of a spent pickling bath from the pickling of metals, e.g. alloyed steel. The pickling of un-alloyed and low-alloyed steels, is carried out using sulphuric acid or hydrochloric acid, and in these processes there are methods available for the utilisation of the used pickling solutions. Where high-alloyed steel is concerned, and other metals and metal alloys, however, different acids and acid mixtures have to be used. Foremost amongst these are mixtures of nitric acid and hydrofluoric acid, for example for stainless steel. The spent pickling bath thus in this case will contain iron, chromium, nickel, molybdenum etc.

A characteristic pickling bath of this type contains nitric acid in a quantity of 50–250 grams per liter, hydrofluoric nitric acid in a quantity of 50–250 grams per liter, hydrofluoric acid in a quantity of 5–50 g/l, iron in a quantity of 10–50 g/l, chromium in a quantity of 1-10 g/l, nickel in a quantity of 1–20 g/l, and molybdenum in a quantity of 0.1–2 g/l. It may have a temperature of 25°–100°C when coming from the pickling process.

Another field of application is in the extraction of copper from sulphidic ores. Poor ores have previously been leached under oxidizing conditions, resulting in sulphate solutions from which the metal was precipitated using scrap iron. Metal has been produced from rich ores by the direct blast process in which the sulphur is converted to $SO_2$ and discharged to the atmosphere with flue gases. The present invention now makes it possible to extract copper or other metals from sulphidic ores by a leaching process, without producing any $SO_2$ and flue gases.

EXAMPLE 1.

A used pickling bath, which has been employed for the pickling of stainless steel or acid-resistant steel, has the 8n

| | |
|---|---|
| $HNO_3$ | 150 g/l |
| HF | 30 g/l |
| Fe | 30 g/l |
| Cr | 4.8 g/l |
| Ni | 7.5 g/l |
| Mo | 1.2 g/l | the pickling bath is treated in accordance with the flow chart. $H_2SO_4$ is added in a quantity of 54 g/l. This quantity is equivalent with the metal content of the solution. If the metals are in a valency stage lower than the normal one, the quantity of sulphuric acid can be lower.

The pickling bath is cooled to normal temperature and extraction is carried out using an organic phase of 25 % kerosene and 75 % tributyl phosphate. Nitric acid, hydrofluoric acid and also molybdenum transfer to the organic phase. The acids in the organic phase are extracted with water and recycled to the pickling bath. Any residual quantities of acids in the organic phase, and molybdenum, are extracted with a sodium hydroxide solution, whereafter the organic phase is recycled to the extraction stage. The refined product is neutralised employing sodium hydroxide, the heavy metals precipitating as hydroxides, which are returned as raw materials to the steelmaking process. This leaves behind a solution of sodium sulphate, which is discharged to a suitable recipient.

EXAMPLE 2.

A spent pickling bath having the composition disclosed in Example 1 was processed as follows. Sulfuric acid was added in a quantity of 65 g/l. The solution was cooled to 20°C and was extracted with an organic phase having the composition disclosed in Example 1. The extraction took place in an extraction tower containing 200 perforated plates. The volume ratio of organic phase to spent pickling solution was 2.5 to 1. The organic phase was washed with water in a second extraction tower, to transfer the monovalent inorganic acids to the aqueous phase. The quantity of water was 50 % higher than the quantity of spent pickling bath. This excess of 50 % is equivalent to the loss of water by vaporization during the pickling process. Consequently there was an equilibrium of water as far as the total process was concerned. The aqueous phase contained 95 % of the nitric acid and 70 % of the hydrofluoric acid of the spent pickling bath. The loss was compensated by the addition of fresh quantities of acids. the organic phase was washed with a solution of sodium hydroxide, to remove residues of hydrofluoric acid and molybdenum, and was subsequently returned to the extraction process. The sodium hydroxide solution was mixed with the aqueous solution from the extraction process. The fluoride ions in said mixture were precipitated by the addition of an equivalent quantity of lime. the metal ions were now precipitated as hydroxides, by neutralizing said mixture with sodium hydroxide. The precipitated calcium fluoride and metal hydroxides were returned to the steel making process. Metals were recovered from the metal hydroxides, and the calcium fluoride was used as slag forming agent. The residual aqueous solution contained $Na_2SO_4$ in a quantity of 135 g/l, and 5 % of the nitric acid, and was discharged to a recipient.

EXAMPLE 3.

A sulphide ore containing 20.6 % Cu, is leached with an acid mixture containing 6 mols per liter of nitric acid and 4.5 mols per liter of sulphuric acid. The nitrous gases developed are oxidised and recycled as nitric acid. The leaching solution contains 18.4 g/l, Cu, 2.1 g/l, Fe and 148 g/l $HNO_3$ together with sulphuric acid originating both from the added acid and from the oxidised sulphidic sulphur. The leaching solution is extracted using an organic phase containing 25 % kerosene and 75 % tributyl phosphate. The organic phase removes 99.9 % of the $HNO_3$ which is recovered from the organic phase by leaching, and is recycled to the process. After extraction, the leaching solution consists of a sulphuric acid solution containing 25.5 g/l Cu, 2.9 g/l Fe and only 0.05 g/l $HNO_3$. The copper can be extracted from this solution selectively by extraction with an organic reagent, using a known method.

What we claim is:

1. A method of removing monovalent inorganic acids from an aqueous solution containing metal salts of said monovalent inorganic acids said monovalent acids being nitric, hydrochloric, or hydrofluoric acid, said method comprising of adding to said aqueous solution sulphuric acid at least equivalent in amount to the metal ion content of the solution, extracting said monovalent inorganic acids by bringing the solution into contact with an organic liquid phase, said organic liquid phase including compounds forming adducts with said monovalent acids, and separating said organic liquid phase from said aqueous solution.

2. a method as claimed in claim 1, comprising decomposing said adducts to release said inorganic acids, and removing said inorganic acids from the organic phase.

3. A method as claimed in claim 2, comprising recovering the acids from the organic phase by contacting the organic phase with an aqueous solution.

4. A method as claimed in claim 2, comprising removing metal ions from the organic phase prior to the decomposition of the adduct.

5. A method as claimed in claim 2, comprising removing metal ions from the organic phase after the removal of monovalent inorganic acids.

6. A method as claimed in claim 1, comprising recovering metal ions from the aqueous solution after the extraction of the monovalent inorganic acids.

7. A method as claimed in claim 6, comprising precipitating metal ions in the form of hydroxides.

8. A method as claimed in claim 6, comprising extracting metal ions from the aqueous solution by means of an organic phase.

9. A method as claimed in claim 1, wherein the aqueous solution consists of a pickling bath for pickling metals, the bath containing nitric acid and hydrofluoric acid and, after having had sulphuric acid added in a quantity at least equivalent to the metal ion content, being brought into contact with an organic liquid phase containing compounds which form adducts with hydrofluoric acid and nitric acid, whereafter the organic liquid phase is washed with water to remove the acids from the organic phase, and the resultant aqueous solution of hydrofluoric acid and nitric acid is then recycled to the pickling bath for reuse, and the metal ions are precipitated by adding alkali to the extracted acid solution.

10. A method as claimed in claim 1, wherein the aqueous solution consists of solutions originating from the leaching of sulphidic ores with mixtures of sulphuric acid and nitric acid, the developed nitrous gases being recovered by oxidation to form nitric acid, the leaching solution being brought into contact with an organic liquid phase containing a compound which forms adducts with nitric acid, thereafter the nitric acid being removed from the organic phase by leaching it with water, and the nitric acid being recycled to the main leaching process.

11. A method as claimed in claim 1 wherein the organic liquid phase is substantially immiscible with water.

12. In a method of pickling metal articles and a recovery of a pickling solution the improvement comprising pickling the articles with an aqueous solution containing a monovalent inorganic acid, adding sulphuric acid to the spent pickling solution in a quantity to make the sulphuric acid content of the solution at least equivalent to the metal ion content of the solution, bringing the spent pickling solution into contact with an organic liquid containing a compound which forms an adduct with the monovalent inorganic acid, so as to extract said monovalent inorganic acid from the spent pickling solution into the organic liquid, bringing the organic liquid into contact with water so as to decompose the adduct and to extract the monovalent inorganic acid, thus released, from the organic liquid into the water, returning the aqueous acid solution from the second extraction process to the pickling process, and precipitating the metal content of the aqueous solution from the first extraction process.

13. In a method of producing metal by leaching a metallic material and a recovery of a leaching solution, the improvement comprising leaching the metallic material with an aqueous solution containing a monovalent inorganic acid, adding sulphuric acid to the solution thus produced in a quantity to make the sulphuric acid content of the solution at least equivalent to the metal ion content of the solution, bringing the solution into contact with an organic liquid containing a compound which forms an adduct with the monovalent inorganic acid, so as to extract said monovalent inorganic acid from the aqueous solution into the organic liquid, bringing the organic liquid into contact with water so as to decompose the adduct and to extract the monovalent inorganic acid, thus released, from the organic liquid into the water, returning the aqueous acid solution from the second extraction process to the leaching process, and recovering the metal content of the aqueous solution from the first extraction process.

* * * * *

UNITED STATES PATENT OFFICE
CERTIFICATE OF CORRECTION

PATENT NO. : 3,870,060
DATED : March 11, 1975
INVENTOR(S) : Liljenzin et al.

It is certified that error appears in the above-identified patent and that said Letters Patent are hereby corrected as shown below:

In Item [22] of the Heading, the filing date should read -- February 26, 1973 --.

Signed and sealed this 20th day of May 1975.

(SEAL)
Attest:

RUTH C. MASON
Attesting Officer

C. MARSHALL DANN
Commissioner of Patents
and Trademarks